United States Patent [19]

Pryor

[11] Patent Number: 4,482,960
[45] Date of Patent: Nov. 13, 1984

[54] ROBOT TRACTORS
[75] Inventor: Timothy R. Pryor, Tecumseh, Canada
[73] Assignee: Diffracto Ltd., Windsor, Canada
[21] Appl. No.: 323,395
[22] Filed: Nov. 20, 1981
[51] Int. Cl.³ .......................... B62D 1/28; G05D 1/00
[52] U.S. Cl. ...................................... 364/424; 364/456; 364/444; 250/202; 172/6; 172/4.5; 37/DIG. 1
[58] Field of Search .................................. 172/4.5, 5, 6; 37/DIG. 1; 364/424, 444, 456, 449; 250/202

[56] References Cited
U.S. PATENT DOCUMENTS

3,813,171 5/1974 Teach .............................. 172/4.5 X
4,049,961 9/1977 Marcy .................................. 250/202
4,077,488 3/1978 Bennett, Jr. et al. ................... 172/6
4,119,900 10/1978 Kremnitz ......................... 364/424 X
4,263,973 4/1981 Boulais et al. ........................ 172/4.5
4,299,290 11/1981 Nunes, Jr. ............................. 172/4.5

Primary Examiner—Gareth D. Shaw
Assistant Examiner—Ronni S. Malamud
Attorney, Agent, or Firm—Larson and Taylor

[57] ABSTRACT

Disclosed is an electro-optical and microcomputer based method and apparatus for automatically guiding tractors and other farm machinery for the purpose of automatic crop planting, tending and harvesting. Also disclosed are means for automatic picking, excavating and other off-road uses in relatively confined areas.

12 Claims, 11 Drawing Figures

CAMERA OUTPUT

NO FURROWS STRAIGHT LINE IMAGE

FIG. 3B

COMPUTER LOCKS ON CENTERLINE OF TROUGH (OR PEAK)

FURROW, IMAGE DEPTH D'

FRUIT WITH PROJECTED GRID LINES IMAGED BY CAMERA 811.

FIG. 4A

ROBOT TRACTORS

BACKGROUND OF THE INVENTION

This invention is directed at automatic guidance of tractors and other farm machinery so as to minimize the human labour required for farming as well as to provide vastly increased equipment utilization. This would tend to provide higher outputs for any given equipment base and in some cases, can actually allow some jobs to get done that could not be done properly, given normal equipment.

SUMMARY OF THE INVENTION

For example, in essence, it is proposed to use automatic electro-optical guidance systems and microcomputer implementation to guide the tractors along the straight rows of the crop whatever it is. The tractor would run unattended with a monitoring device remotely located to tell how the tractor is progressing and, if desired, present a visual display as seen by the guidance camera of the tractor. It is estimated that tractors could run all night long in such a mode given high sensitivity cameras operating under moonlight or starlight or what's more likely the coupling of sensitive cameras with headlights from the tractor.

The ability to operate at night immediately provides a maximal utilization of equipment cost since it can be utilized 24 hours a day rather than just 12 or 16 at most. Naturally it also saves considerable labor (which also may be unobtainable at any price in certain locales) simply because of the fact that no one is required to ride the tractor. Finally, it helps change the agricultural job from one of the lower level task to actually a rather high level task of maintenance and repair of sophisticated machinery.

The ability to plow all night without fatigue cannot be stressed too much since this allows one to bring in crops in short periods of time. For example, before storms, or before certain other temperature or climatic conditions arrive or cease. It also obviously allows 24 hour usage of equipment. It is considered that one might use guidance systems coupled to any particular type of tractor which would be removeable and could be rented to people in different climatic areas that would have requirements at different times. This would allow the maximum cost effectiveness of the sensor and computer hardware to be shared amongst more users.

To conclude, one of the big incentives to develop such a unit is that it provides considerable improvement in the cost effectiveness of farm equipment through:

1. Reduction of scarce and expensive manual labor involved in driving the equipment.
2. Increased equipment utilization provided by its ability to operate at night without fatigue.

The cost of such automatic control equipment can be offset, at least in part, by certain savings in the tractor construction that are necessary because of the presence of the manual operator. These include:
   (a) Cab
   (b) Roll over protection
   (c) Air conditioning and heating for the cab.
   (d) Soft seats, stereos and other amenities for the operator.
   (e) Elimination of the steering wheel (which would probably need to be retained in some form, however, for manual backup) and other such things could also be considered. The whole shape of the tractor or combine might be altered to have a low sillouette etc.

Key items in the invention are as follows:
1. A tractor or other farm machinery capable of accepting inputs and responding to inputs to allow it to be steered, throttled and/or braked, and possibly shifted into reverse as well as forward plus start and stop.
2. A solid state camera or other electro-optic system capable of operation in the tractor environment which observes ahead of the tractor and possibly behind as well to see the furrows, rows and other paths which the tractor is to take.
3. A microcomputer system coupled to the camera and to the tractor controls which interprets the signals from the camera and optionally utilizes a predetermined routing map of the field.
4. For night use, a lighting system for an image intensification system for the camera.
5. An optional external reference frame vision unit.

DETAILED DESCRIPTION OF THE PREFERRED EMBODIMENT

Figure 1:
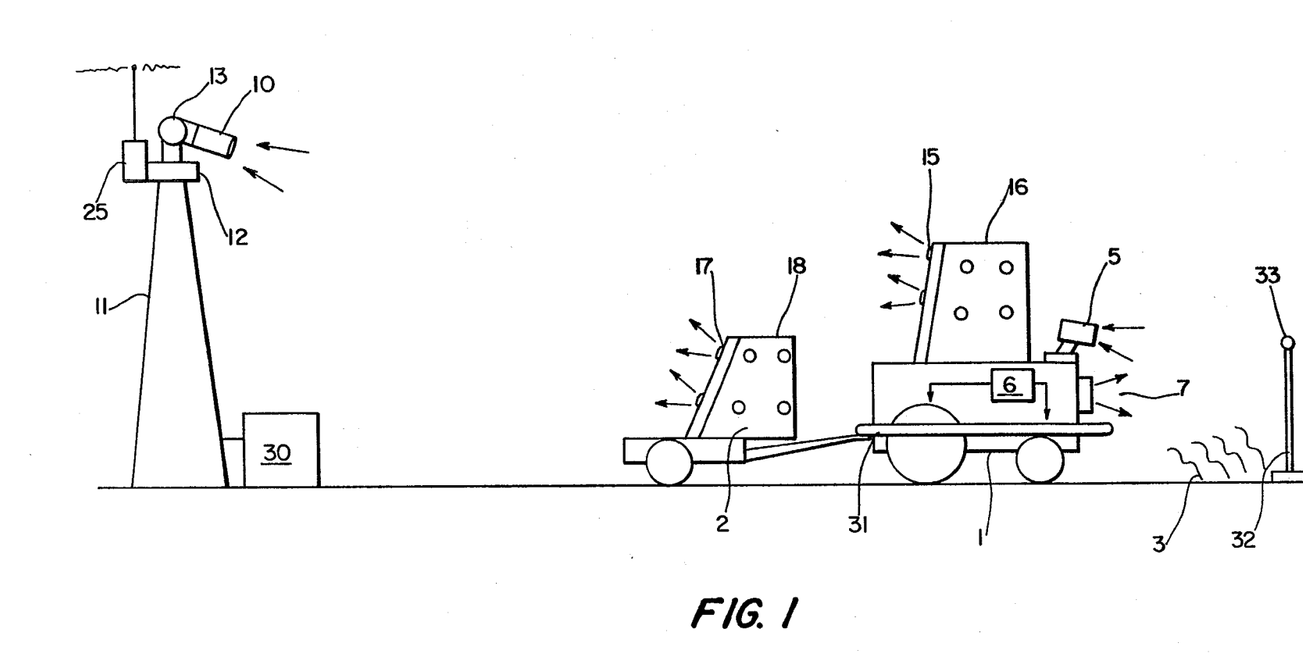
FIG. 1 is a schematic representation of an elevation view of a robot tractor according to the present invention including an external reference.

FIG. 1 illustrates a basic embodiment of the invention. A farm tractor 1, pulling plow 2, automatically is guided along rows of furrows 2, using solid state TV camera 5 whose data is processed by microcomputer 6 and used to control the steering and throttle of the tractor. Flood light 7 is useful for night operation.

The camera views ahead and to one side of the tractor, particularly the rows previously dug which microcomputer senses by the varying gray level (or color if so equipped) and determines a parallel path. When the tractor has reached the end of the furrowed area, it executes a pre-programmed 180° turn, locks on the furrows just plowed and proceeds again.

Optionally or alternatively, a second camera 10 is utilized ideally located in a high area (e.g. a tower 11) at the edge of the field to track the tractor and provide an external reference frame for its operation. Suitable sets of targets 16 and 15 are provided on the tractor (and optionally targets 17 and 18 on plow 2). Each set is composed of typically 3-4 points such as white spots on black background. From any viewing angle the, targets are ideally visible to allow range, and attitude as well as location to be determined via triangulation. Targets can also be made up of pulsing lasers, LEDs or flash guns visible at night or in adverse weather conditions.

Many electro-optical sensors have recently been described by the inventor in copending application which may be of use herein. These are incorporated by reference.

1. Electro-optical sensor systems for thread and hole inspection Ser. No. 64,867, now U.S. Pat. No. 4,315,688
2. Method and apparatus electro-optically determining the dimension, attitude and location of objects: Ser. No. 34,278, now U.S. Pat. No. 4,373,804
3. Method and apparatus for determining physical characteristics of object and object surfaces: Ser. No. 15,792, now U.S. Pat. No. 4,305,661
4. New photodetector array based optical measurement systems: Ser. No. 163,290, now U.S. Pat. No. 4,394,683
5. Electro-optical inspection, Ser. No. 269,614 which is a continuation of Ser. No. 073,226 now abandoned
6. Co-ordinate measuring method and device, Ser. No. 560,259 which is a continuation of Ser. No. 207,081, now abandoned
7. Electro-optical sensors with fiber optic bundles, Ser. No. 173,370
8. Electro-optical surface roughness measurement and control. Ser. No. 240,459
9. Apparatus for determining dimensions, Ser. No. 134,465, now U.S. Pat. No. 4,403,860
10. High speed electro-optical inspection, Ser. No. 525,801 which is a continuation of Ser. No. 203,866, now abandoned
11. Fiber optic based robot controls, Ser. No. 200,401
12. Electro-optical sensors for machine tool and robotic inspection. Ser. No. 247,399

Optional but recommended are safeguard systems such as buried wires around the field, bumpers on the tractor, etc.

In operation, the farmer would essentially program the tractor, pulling a hoe, to go back and forth in a regular pattern to furrow the field. In a second 'fence line' mode, this would be done at first by guiding the tractor along the edge of the field. The guiding could be done optically using, let us say, a fence line (either normal fence or better, composed as well with flashing lights etc.) or through use of a buried cable. If done optically, the camera would sense the line of the fence and keep the tractor a constant distance from that line. When the programmed end of the field was reached as sensed from an odometer, (or if slippage was taking place from other types of sensors interpreting the velocity of forward motion, or for that matter, from sensed edges of the field picked up on a fence line, for example), the tractor then is caused to turn 180° and head back down parallel to the row just hoed.

It is the job of the sensor to guide the tractor down parallel to the row hoed and this is done by sensing what the hoed row looks like, similar to that done by the human. It is obvious that the sensing would be somewhat different depending whether one was sensing for furrows, corn stocks or whatever. However, basically, the idea is to track on a macroscale, the line of the furrow or corn row etc. and not look too closely at the minor detail. This can be done with a relatively simple computer algorithm operating on the scan data from the camera.

The tractor then, after executing the 180° turn, goes down following the row to the end, whereupon it senses that the fence line again is approached and makes another 180° turn in the other direction and proceeds. It does this until a fence line can no longer be seen or until a pre-programmed number of turns have been made. Comparison with an odometer gives a rough idea of that as well. Optionally, external reference frames from overseeing cameras can be used, eg. 10, described below.

For safety sake, to keep the tractor from running away in case of failure, there are two possible things of many that can be done even though totally unattended. The first thing is to employ a simple bumper system around the tractor such as used by toys etc. In this case, a limit switch where, if the bumper contacts anything, the tractor stops and a warning signal is flashed back to the central control point such as the farmer's home. Position of the bumper as low as possible would seem to preclude most types of foreign objects being run over or the tractor from going through fences and so on. Naturally, if the field is fenced, the tractor would automatically stop upon hitting the fence in this mode.

A second safeguard is to run buried cable around the field and have a magnetic sensor looking for the cable. The cable could actually be charged electrically such that an unmistakable field signal was obtained. This would act as a deterrent that would allow one to stop one before arriving at a fence line for example, and would be a double check on the system. It should be noted that the guard all the way around the tractor does provide an easy way to stop the tractor by just coming up and touching the guard.

It is envisioned, at least during daylight hours, that on large plots, multiple tractors might be plowing at once in which case it would be economic to have a central control point possibly in a tower-type location where a single operator could have an overview of all the tractors plowing the various fields. This coupled with feedback from the tractor would allow him to know whether they are running properly etc. He could naturally even see the furrows being plowed and this would give him a good feel for what was going on. It could even be noted that since the camera is capable of giving the images out that the total image from the camera, TV type could be transmitted on short range television to the monitors in the control tower so that every tractor in the field would have a picture of what it was seen presented.

There would be other safeguards also incorporated into the microcomputer. For example, it is obvious that in feeding correction commands relative to going down furrows, that there would never be anything like a 90° turn for example, except at the end of the row. Therefore, correction signals would be allowed, and if the tractor kept turning while still receiving such correction signals, it would actually stop. This would indicate that a malfunction was occuring in the furrow sensing circuit or something was amiss in the field of view.

The pricing advantages of this particular approach are quite interesting. First, it is estimated that the control system might, in volume, cost no more than $20,000, complete. Since a deluxe cab with air conditioning, stereo, etc. can cost $8,000 and would not be required in this case, it is clear that the net cost may only be in the $10–$12,000 range. This would be easily made up in the first year of operation without an operator—nevermind any advantages in increased equipment utilization at night and so forth. Therefore, the economics of this can be compelling indeed. It should be noted that farm machinery is not utilized totally throughout the year and the people hired or kept on for tasks, therefore, the replacement of time while on the tractor is not the total labor saving cost.

The Control System

The unit, in certain versions, breaks down into the following categories of sub systems:

1. The optical sub system is used to scan and analyze the data from the field ahead of the tractor (or combine etc.). This would typically be a solid state TV camera connected to special hardware image circuits and finally into the system control microcomputer. There might even be in this case, two microcomputers, one strictly for image data, the other for system control.
2. The steering and braking sub system, which would essentially take the inputs from the system microcomputer including the processed image data and preprogrammed data, plus any external limit data and cause the tractor to either stop, turn, or what have you. Conceivably, the braking sub system, in this case, could be extremely simple.
3. The system control microcomputer is used to analyze the optical signal inputs and convert them into the appropriate commands to the machine as well as accept preprogrammed information concerning the plowing strategy to be followed. This could include the direction to be taken, the program limits of the outline of the farm etc.

It is clear that the degree of programmability of this system relates in large measure to the ability to tell where one is at on the farm. This, in essence, requires either some sort of accurate odometer (known to be difficult to achieve) or a means of using the optical sub system or some other system to create distance command inputs.

One such distance type input that has been suggested is to use radio or ultrasonic transmitters to phase the data in the direction finding context which would allow the tractor to have a fix on its bearing in the field at any given time. This could well be desirable and would also provide a limit on the tractor's motion preventing runaways. Another approach is using an external optical reference frame as discussed below.

4. Visual monitoring sub systems. It is conceivable that it might be desirable to radio back the visual image data to some centralized monitoring facility. This monitoring facility could simply be a farmer's home TV set. In the ultimate case, a miniature TV transmitter could be utilized to directly transmit the image data to provide a "tractor's eye" view of the field. Superimposed on the image would be pertinent data such as location coordinates. Superimposed by the receiver microcomputer could be a map of the farm on the TV set showing the tractor's progress. This really costs little more than the additional transmission cost as well as decoding cost at the TV set.
5. Basically, it is thought that the guidance system would best function by actually viewing the field to be plowed including the previously plowed furrows etc. as well as possibly auxilliary marking unit at the end of the field to allow the tractor to be sighted and to serve as indicators for turn around.

The problems as perceived in the operation of this tractor are as follows:

1. Perfection of the optical and control system such that the tractor does a good job without ruining crops by running across rows etc.
2. Prevention of runaways in which the tractor leaves the bounds of the farm or the field being plowed or does some other strange maneuver, such as going around in circles etc.
3. Prevention where at all possible of runover conditions. One example is a drunken farm hand coming into the field, falling asleep and being run over by the tractor an hour later say. This latter is a rare potential case, but one which needs to be examined. So is the case of vandalism, particularly when running at night.

Various means are possible to largely preclude these undesirable events from happening. These include at a minimum, the following:

1. Bumper type limit switches to physically shut the tractor off if the outer bar comes in contact with a fence, person etc. (FIG. 1, item 31)
2. Sensors to cut the tractor off if it strays beyond given bounds. These sensors can react to buried cables or optically to laser beams, for example, deliniating the farm or can even use the system visual guidance to track stakes etc, for example fence 32 in FIG. 1, which may also have flashing light 33 for greater visibility.
3. The computer can be programmed to guard against any control commands that would cause circular motion or some other strange motion regime not called for in normal operation.

Naturally, any of these events, if it happens, should cause an alarm to be sounded at the control center. One more technique that can be used is obviously that, if anything resembling a human gets in the frontal path of the tractor vision system, or for that matter, anything that is not preprogrammed to be typical of the farm to be plowed. This would easily allow, for example, a standing person, a fence post etc. to be discriminated against and the tractor shut down until that object was no longer in view.

One other obvious possibility is vandelism in which case parties could come and try to trick the tractor by blocking the vision etc. These things can probably be interlocked to the point where the tractor sub systems are simply shut down and the alarm rings.

In the description above the general concept of the guided tractor has been put forward. It is clear that in the form shown in the FIG. 1, the determination of the position of the tractor in the field is based, at least in the tracking of rows, on processing of the images obtained by the matrix camera. This matrix camera image processing essentially takes two forms.

The first is the deliniation of the points in the image themselves. In other words, the features that are going to be used in order to tell the rest of the processing how to adjust the tractor. Naturally like the image to the person it is composed of gray level lights and darks (with or without color). Processing such as that shown in a copending application (now U.S. Pat. No.

4,394,683) of which this inventor is one of the inventors, does provide the circuitry for two axis image mensuration of either spots or edges of objects.

Clearly, any such real time deliniation of where certain meaningful spots and edges are saves a vast amount of computer data processing for the tractor and can be crutial if quick maneuvers are required where there is simply not time to process data in any great degree. The tractor case is of course one where at certain times quick maneuvers are used but for long distance tracking of a single row, rather long processing times can be used to assure that the row is being carefully followed.

The direct image data that consists of essentially spots is for example rows of corn which tend to look bright with dark areas in between. In fact rows of anything somewhat fit this bill and yield a modulation of points that can be sensed.

It is now however desirable according to the invention, to show some additional ways of sensing without relying on gray scale or color images entirely.

Figures 2, 2A:
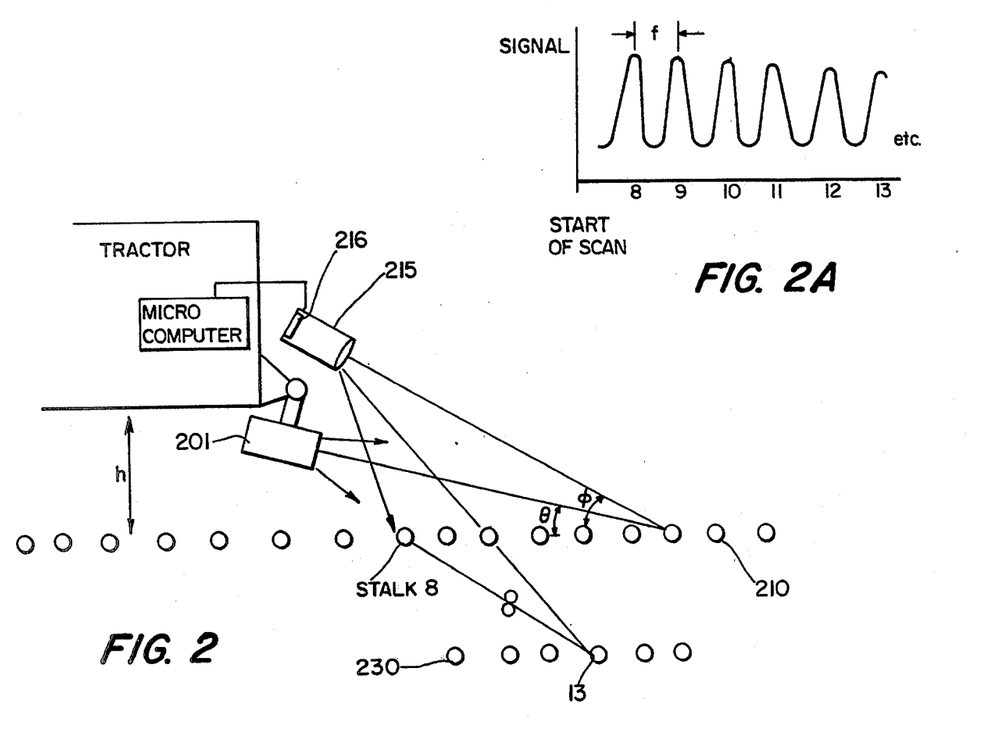
FIG. 2 is a schematic plan view of a tractor following a row.
FIG. 2A is a schematic representation of the output signal of a detector viewing a row of corn stalks.

Consider FIG. 2. This shows a projector of light 201 throwing a fan of light out centered roughly on angle $\theta$ from a row of cornstalks 210. The image of the stalks is viewed by matrix array camera or linear array photo diode array camera 215 located at a larger angle $\phi$. This particular sensing is typical to that used by the inventor for sensing of screw threads in holes and it is interesting to note the evenly planted corn in many respects produces images like those of the screw threads when illuminated at an oblique angle such that shadowing occurs between the stalks.

The signal that comes off array 216 under these conditions is proportional to the spacing of the corn. It is also proportional to the distance of the corn from the tractor. Clearly there is a particular preferred image frequency that results when the tractor is pointed parallel to the row and this is sensed by the detector 215 and used to orient the tractor both in spacing from the row (which is in a sense the position of a signal burst in the camera field) and in parallelism to the row (which is related to the frequency). This output signal depicted in FIG. 2A.

Quite clearly if the tractor goes slightly off the row to the left as shown, the signal drops to zero and becomes totally out of focus. If the tractor veeres to the right too much the signal also goes out of focus and the distance illuminated becomes forshortended. In either case, one has a certain way of telling that the tractor is not too much deviated.

A second problem in the field is tracking a furrow. In the alternative embodiment of FIG. 3, a light source unit 250 above and to the front of the tractor 270 projects a line 251 in front of the tractor that the camera 260 can image from an angle $\theta$ included. It is noted that this camera can be the same camera as item 215 above if this camera is sufficiently pointed in the forward direction. It is also of interest to think of a camera 215 on a rotary mount such as 280 that can point in more than one direction with the light projector such as 201 either also movable or remaining fixed. Naturally there is also the possibility of multiple cameras which is discussed below in more detail.

Figures 3, 3A:
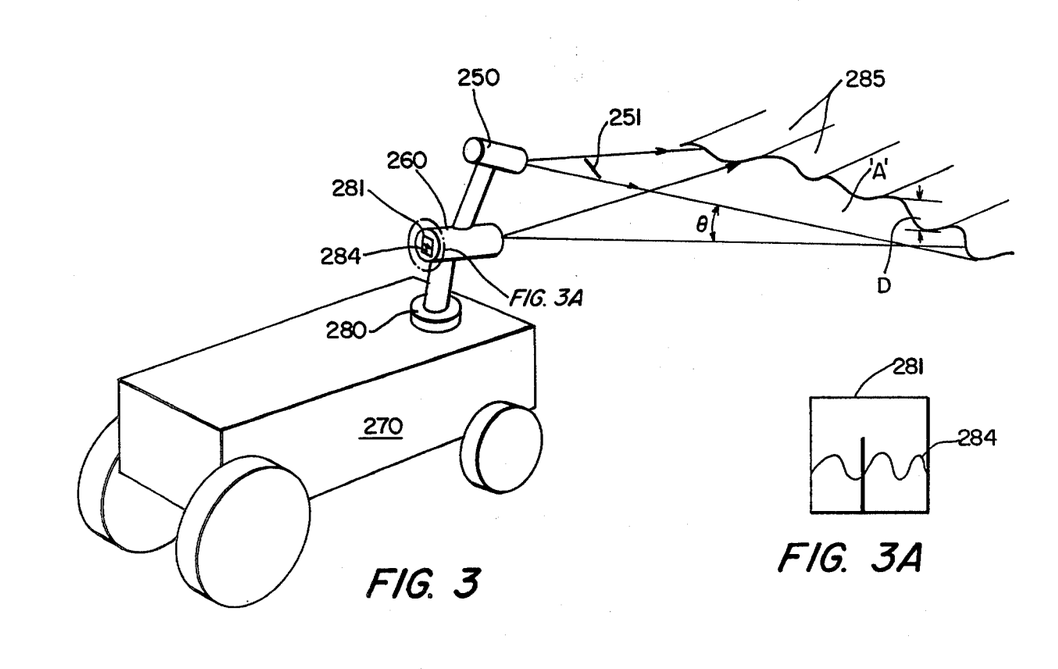
FIG. 3 is a schematic elevation perspective view of an alternative embodiment of the present invention.
FIG. 3A is an enlarged view of the output of the array depicted in FIG. 3.
Figure 3B:
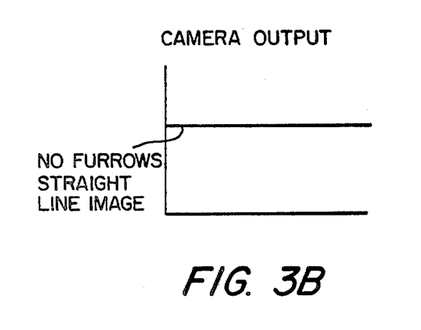
FIG. 3B is a schematic representation of the output of an array where no furrows are present.
Figure 3C:
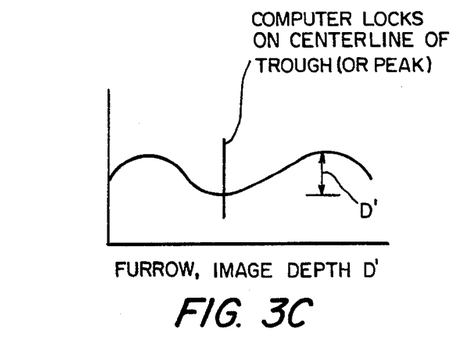
FIG. 3C is a schematic representation of the output of an array where furrows are present and one is being followed.

In any case, it is of interest to consider the projection of a line of light in front of the tractor to illuminate the furrows. The matrix array 281 then looks at the image of the line of light 284 on the furrows 285 which becomes distorted due to the shape of the furrow. As shown in FIG. 3C, by interrogating the matrix array, one can determine very roughly the shape and depth, D, of the furrow cross section and particularly lock on to a tracking signal that keeps the center of the array let us say centered on a particular furrow, "A". If no furrows are present, the output is as shown in FIG. 3B.

The readout of the matrix array 281 (shown in greater detail in inset FIG. 3A) finds the center of the line projection which can be done very neatly using the second differential circuitry of a referenced co-pending application (now U.S. Pat. No. 4,394,683).

As an alternative arrangement, a grill of parallel lines can be projected which can also be sensed although this does not seem to provide any additional data on the furrow it can be used in case there are giant dropouts in the furrows so that one would always have at least one line on the screen. There are also other advantages of it for looking at other things such as more complicated contours as in pickers which are described below.

It should be noted that suitable light projectors include halogen lamps with slits or grills in front of them or, as in the FIG. 2 case of item 201, with just a lens in front. Naturally in the grid projection case, it is of interest to focus the line to as small a zone as possible out in front of the tractor. This is because the included angle at the distance one would like to see is relatively limited between the grid projector and the camera. For this reason one would like to locate the two as far apart angularly as possible and this can mean a relatively tall pole or support bridge above the tractor holding the projection or receiving unit. There's nothing persé wrong with this other than it looks odd. This support too can hold the targets for the external guidance described below.

The further use of projecting multiple lines of course is that in extremely rough areas this allows at least one of the lines to be observed as was pointed out. In other words, one would always scan let us say the average of 3 or 4 lines to determine an instantaneous center point between them rather than just lock the tractor onto one particular deviation point of a section of the furrow.

Also described in a copending application (Ser. No. 200,401) is the use of multiple sensors reading into one matrix photo diode array. Particularly this was described relative to even very inexpensive area based fiber optics in the application copending. It has also been discussed with respect to robot control systems and both of these discussions are apropos here.

In the case of the tractor guidance problem, multiple sensors can be utilized having different functions to play. For example the one looking at the furrow projection might not be the same as for example the one looking at the corn row signatures. Indeed with available matrix photo diode arrays in the 500×300 element range, it is possible to share such a sensor with multiple image data gathering points via fiber optics.

The fiber optics utilized could be of the coherent type or waveguide type when available which would allow the image to be transmitted. Clearly this would be required in the furrow case but a linear ribbon cable could possibly be used in the corn row case of FIG. 2. In any case, it is intended that this invention should disclose the use of such coherent fibers for use in obtaining multiple points of data with respect to the operation of the tractor and particularly into viewing for different features at different angles around the tractor but of course particularly ahead and behind.

The advantage anyway of using the fibers even on multiple arrays is that the central processing unit can be located remotely in the base of the tractor with no electronics anywhere around.

It is also of considerable use to flash light sources which can achieve very high signal to noise ratios and as well achieve non blooming of the camera. The problem of course comes in that the operation is assumed during sunlight when projection of any auxilliary light would be very difficult from a signal to noise basis. To some degree, nightime operation is even better in this regard.

Because of the sunlight level, one might have to relay on data from the gray scale image with only seldom getting data from the light so projected. This is of course unless one uses a laser as a light source in which case filtering can also be done on a wavelength basis as well.

Figure 2B:
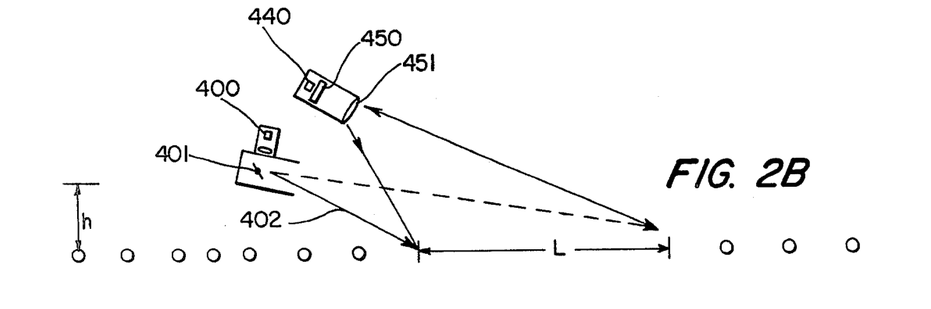
FIG. 2B is a schematic plan view of a laser scanning embodiment of the present invention.
Figure 2C:
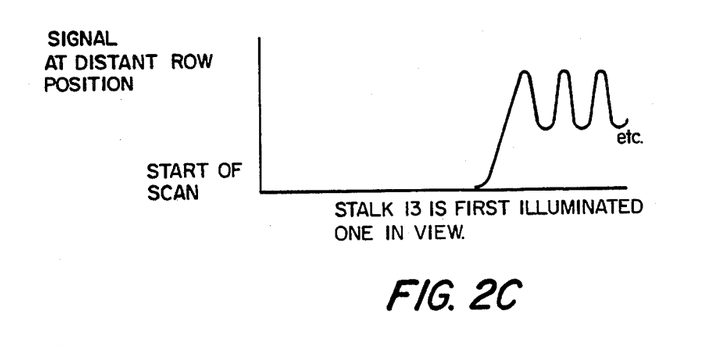
FIG. 2C is a schematic representation of the output signal of a detector viewing a second and inwardly spaced row of corn stalks.

It is of interest now to consider utilizing a scanning laser beam as opposed to the camera and projection of FIGS. 2 and 3. In the FIG. 2B case, for example the projector unit 201 is replaced by a laser light source such as a CW diode laser 400 or HENE gas laser which has a small oscillating mirror 401 in front of it. This unit then scans the laser beam 402 up and down the corn row over distance "L" (equal to the previous fan width of projector 201) producing the same sort of signature. The detector in this case however does not have to be a matrix array and can be a simple photo detector 440 saving some cost. This would seem to have some application for this because of the higher signal to noise of the laser beam, through interference filter 450. Lens 451 has a field of view which is equal to "L" at the nominal distance "h" to the row adjacent. The interference filter 450 is also useful in cameras 10, 5, and 215, if laser light sources are used.

In the FIG. 3 case, the same holds true. The bar in this case would be a scanned laser beam and in this case the detector array, which like the detector 201, would have an interference filter in front of it to discriminate from sunlight, would only now have to be a linear detector array in order to find the position of the furrow. In this case, the furrow position is scanned along and picked off accordingly. Even then though, the power of commercially available lasers is relatively low to where this is quite difficult to do at the ranges desired. Modulating the light source and demodulating the detector signal then is perhaps required in order to achieve sufficient background noise discrimination.

The targets 16 and 17 (and 18 and 19), shown in FIG. 1 can be white dots on black screens, pulsed laser diode or Xenon flashes or modulated lasers etc.—anything that allows unambiguous detection in all circumstances.

The camera system 10 functions in a manner similar to that described in L. Pinckney et al. U.S. Pat. No. 4,219,847. As data on the tractor is obtained, it is communicated via a radio transmitter, 25, to microcomputer 6 or an external computer such as 30 having overall control of the operation.

Data from 10 so obtained, allows determination of tractor location in all axes at all times from a single vantage point. To be useful in general, however, the camara 10 must rotate and track the tractor and perform a co-ordinate transformation using the rotational position and target data to convert guidance signals to the tractor into cartesian coordinate typical of most fields. Motorized, encoded base 12 and mount 13 are provided for this purpose.

Clearly, one such rotatable camera 10 could be used to track may different tractors in a large field.

Such a tracking system (or even a simpler one) provides that the tractor(s) will not run away. It also allows foreign objects to be seen from a more global view and appropriate tractor commands provided to avoid them. It further allows the attitude of the implement or tractor to be determined and unusual conditions corrected.

In addition, camera 10 and its associated computer system can be used to replace the tractor mounted camera, 5, altogether. While less preferred than a combination of both 'local' and 'global' views, in many cases (eg. flat, unobstructed land) a single overall view is enough—particularly if camera 10 is high enough off the ground. The camera 10 can be equipped with both target and gray level field sensing capabilities (and can even be more than one camera unit if need be, with more than one lens). Cameras such as 5, 10 or 215 can also be equipped with microchannel or other image intensifiers such as 8, to provide operation in low light level conditions eg. at night. These can also be used to 'gate' the sensing with pulsed light sources such as lasers or flash guns, if used.

Clearly, the invention can be used to control other machines such as excavators, bulldozers, road graders and the like.

Figure 4:
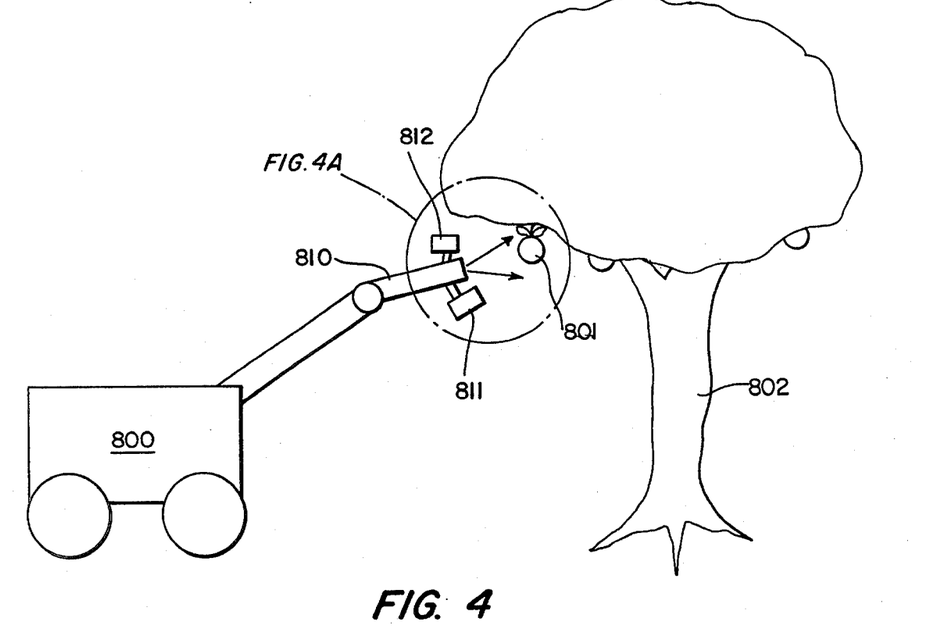
FIG. 4 is a schematic representation of a robot picking device according to the present invention.

The final embodiment, FIG. 4, shows a robot picking machine 800 used to pick fruit such as 801. The fruit is in trees 802 and the picker, which now looks it is intended here, to utilize a commercial robot electrically controlled having 5 or 6 axes of motion to actually do the picking. This picker contains an optical sensor unit 810 such as the camera shown which looks for the correct fruit etc. to pick.

Figure 4A:
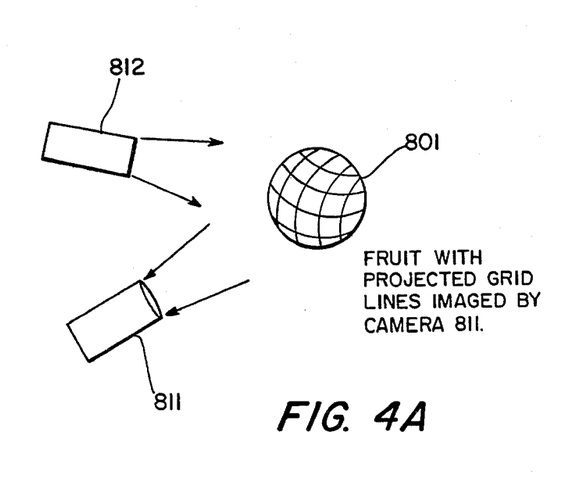
FIG. 4A is an enlarged view of the grid projection depicted in FIG. 4.

The sensor 810 is composed of a TV camera 811 in color or with separate color sensors as well as a line or grid projection system 812 which as it approaches a potential candidate for picking, projects a line or grid onto it and can immediately see if it is of the right curvature and size by scanning the contoured image of the line or grid on the fruit. This same approach is by no means limited only to fruit and can be used with more complexity for picking tobacco and other hard to pick items as well.

Once the optical signal has locked the unit onto the part, the hand goes and grabs it. For this reason it is desired to build the optical sensors into the hand in some cases or to ride along with the hand with the robot. This has been described in a copending application on robotic applications. To aid in picking, targets as previously described can be placed on the tree limbs near the fruit to allow the unit to more easily find the correct position.

What is claimed is:

1. A method of automatically controlling the operation of tractors, combines and other agricultural machinery in a field comprising the steps of:
   sensing a characteristic of the field adjacent the machinery with a first electro-optical sensor located on the machinery;
   determining a desired steering, throttle position, or other control function of the machinery from the sensed characteristic using a microcomputer located on the machinery, the microcomputer being programmed for terrain, field size, crop type, or other appropriate variable of the field;
   determining the position of the machinery in the field relative to a reference point using a second electro-optical sensor and a target, one of the sensor and target being located at the reference point and the other on the machinery; and automatically actuating the steering, throttle, or other control function to guide the machinery in a desired manner of operation.

2. A method according to claim 1 wherein the second sensor is located at the reference point.

3. A method according to claim 2 and further including the sensing of the field adjacent the machinery by the second sensor.

4. A method according to claim 1 wherein the first sensor senses the gray level or color image of the field in order to differentiate the characteristic of the field.

5. A method according to claim 1 wherein the sensing step further includes the scanning of an image produced by the first sensor on a matrix photo diode array.

6. A method according to claim 1 wherein the sensing step further includes the projecting of a light source onto a portion of the field to be sensed.

7. A method according to claim 6 wherein a strip of light is projected.

8. A method according to claim 1 wherein the portion of the field sensed is obliquely sidewards of the machinery and the characteristic of the field sensed is crop images.

9. A method according to claim 1 wherein a plurality of first sensors is used in sensing a characteristic of the field.

10. A method according to claim 5 and further including the step of amplifying the light received by the first sensor during low-light operations.

11. An apparatus for automatically controlling the operation of tractors, combines, and other agricultural machinery in a field comprising;

a first electro-optical sensor means for sensing a characteristic of the field adjacent the machinery, said first sensor means being located on the machinery;

a microcomputer means mounted on the machinery for determining a desired steering, throttle position, or other control function of the machinery based on the characteristic of the field sensed by said first sensor means, said microcomputer means being preprogrammed with appropriate field variables;

a second electro-optical sensor means for determining the position of the machinery in the field, said second sensor means including an electro-optical sensor, a target, and a reference with one of said sensor and said target located at said reference and the other on the machinery; and an actuating means for automatically actuating the steering, throttle, or other control function to guide the machinery in a desired manner of operation based on the desired control function determined by said microcomputer and the position of the machinery in the field.

12. An apparatus for controlling agricultural machinery as claimed in claim 11 and further including a light source mounted on the machinery for providing an illuminating light on the field adjacent the machinery.

* * * * *